(12) United States Patent
Syeda-Mahmood et al.

(10) Patent No.: US 7,406,200 B1
(45) Date of Patent: Jul. 29, 2008

(54) METHOD AND SYSTEM FOR FINDING STRUCTURES IN MULTI-DIMENSIONAL SPACES USING IMAGE-GUIDED CLUSTERING

(75) Inventors: Tanveer Syeda-Mahmood, Cupertino, CA (US); Peter J. Haas, San Jose, CA (US); John M. Lake, Cary, NC (US); Guy M. Lohman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/970,946

(22) Filed: Jan. 8, 2008

(51) Int. Cl.
*G06K 9/62* (2006.01)
*G06F 7/00* (2006.01)
*G06F 17/30* (2006.01)
*G06F 17/00* (2006.01)

(52) U.S. Cl. .................. 382/225; 707/3; 707/104.1

(58) Field of Classification Search ......... 382/224–228; 707/3–6, 104.1
See application file for complete search history.

(56) References Cited

U.S. PATENT DOCUMENTS

2004/0013305 A1   1/2004   Brandt et al.
2004/0202370 A1   10/2004  Fisher et al.
2007/0185946 A1*  8/2007   Basri et al. .................. 708/200

OTHER PUBLICATIONS

Gdalyhu et al., "Self-Organization in Vision: Stochastic Clustering for Image Segmentation, Perceptual Grouping, and Image Database Organization", IEEE Trans. on Pattern Analysis and Machine Intelligence, Oct. 2001, pp. 1053-1074, vol. 23, No. 10.

* cited by examiner

*Primary Examiner*—Aaron W Carter
(74) *Attorney, Agent, or Firm*—Cantor Colburn LLP; Van Ngyen

(57) ABSTRACT

A method is provided clustering data points in a multidimensional dataset in a multidimensional image space that comprises generating a multidimensional image from the multidimensional dataset; generating a pyramid of multidimensional images having varying resolution levels by successively performing a pyramidal sub-sampling of the multidimensional image; identifying data clusters at each resolution level of the pyramid by applying a set of perceptual grouping constraints; and determining levels of a clustering hierarchy by identifying each salient bend in a variation curve of a magnitude of identified data clusters as a function of pyramid resolution level.

5 Claims, 10 Drawing Sheets

METHOD AND SYSTEM FOR FINDING STRUCTURES IN MULTI-DIMENSIONAL SPACES USING IMAGE-GUIDED CLUSTERING

CROSS REFERENCE TO RELATED APPLICATIONS

The present application is co-pending with the concurrently filed application, entitled "METHOD AND SYSTEM FOR DATA CLASSIFICATION BY KERNEL DENSITY SHAPE INTERPOLATION OF CLUSTERS," assigned to the assignee of the present application, the contents of which are incorporated herein by reference in their entirety.

BACKGROUND OF THE INVENTION

1. Field of the Invention

This invention relates to data clustering, and more particularly, to the clustering of multidimensional data to determine high-level structures.

2. Description of Background

Data clustering (or just clustering) is the categorization of objects into different groups, or more precisely, the organizing of a collection of data into clusters, or subsets, based on quantitative information provided by one or more traits or characteristics shared by the data in each cluster. A cluster is a collection of objects which are "similar" between them and "dissimilar" to the objects belonging to other clusters. The goal of clustering is to determine an intrinsic grouping, or structure, in a set of unlabeled data. For example, the functional dependency between two or more time series can lie along a curve. As an example, FIG. 1 shows a graph of a functional dependency between a pair of time series that maps to a perceptible curve having a rotated U-like structure. Clustering can be used to perform statistical data analysis in many fields, including machine learning, data mining, pattern recognition, medical imaging and other image analysis, and bioinformatics.

For applications dealing with sets of high-dimensional data such as multimedia processing applications (for example, content-based image and video retrieval, multimedia browsing, and multimedia transmission over networks), the finding of underlying high-level structures by clustering and categorization is a fundamental analysis operation. A good clustering scheme should, for example, help to provide an efficient organization of content, as well as provide for better retrieval based upon semantic qualities. In video retrieval, because of the larger number of additional features resulting from motion in time, efficient organization is particularly important. In image-based retrieval, semantic quality retrieval is particularly important because clustering provides a means for grouping images into classes that share some common semantics.

Even though clustering of multidimensional datasets is important to determining high-level structures, much of the focus in multidimensional data analysis has been on feature extraction and representation, and existing methods available from data mining and machine learning have been relied on for the clustering task. These methods are primarily based upon the similarity criterion of distance or proximity in which two or more objects belong to the same cluster if they are "close" according to a given distance function that defines a distance between elements of a set (for example, the simple Euclidean distance metric).

The nature of multidimensional datasets, however, presents a number of peculiarities that can lead to misleading or insufficient results using distance-based clustering, particularly for cases of grouping high-dimensional objects into high-level structures. First, the number of feature dimensions in multidimensional datasets tends to be large in comparison to the number of data samples. As an example, a single four second action video assuming a pair of features per frame (for instance, for representing the motion of the object centroid) can have at least 240 feature dimensions. Similarly, in image clustering, while color, texture, and shape features can encompass hundreds of features, the number of samples available for training could be comparably small. This can result in a data space that is high-dimensional but sparse. The sparseness of the data points can make it difficult to identify the clusters because observation at multiple scales may be needed to spot the patterns.

A second issue that may arise is that the number of clusters for a multidimensional dataset is often unknown and more than one set of clusters may be possible. Different relative scalings can lead to groupings with different structures, even with measurements being taken in the same physical units. To make an informed decision as to relative scaling using existing clustering methods, either the number of clusters needs be known a priori or a hierarchical clustering must be performed that yields several possible clusters without a specific recommendation on one. In a hierarchical clustering, the process builds (agglomerative), or breaks up (divisive), a hierarchy of clusters. The traditional representation of such a hierarchy of clusters is a tree structure called a dendrogram, which depicts the mergers or divisions which have been made at successive levels in the clustering process. A bottom row of leaf nodes represent data and the set of remaining nodes represent the clusters to which the data belong at each successive stage of analysis. The leaf nodes are spaced evenly along the horizontal axis, and the vertical axis gives the distance (or dissimilarity measure) at which any two clusters are joined. Divisive methods begin at the top of the tree, while agglomerative methods begin at the bottom, and cutting the tree at a given height will give a clustering at a selected precision. The bottom level of the hierarchy includes all data points as one cluster.

As an example of the scaling issue, a clustering scenario is provided that involves a type of dataset for which the structure of the functional dependency between two or more time series can take a variety of forms. As an example, FIG. 2 illustrates a graph of functional dependencies between a pair of time series in which the noticeable structures are that of three separate lines radiating from common points. While different structures from within this graph may be obtained using hierarchical clustering methods, ideally, it would be desirable to have the result of clustering the dataset indicate the lower level structures (such as the individual splotches in FIG. 2) as well as the higher-level structures formed (such as the lines perceived in FIG. 2) without necessarily leading to a single cluster at the top level, unless that is in fact matching how the data collection should be perceived.

SUMMARY OF THE INVENTION

The shortcomings of the prior art can be overcome and additional advantages can be provided through exemplary embodiments of the present invention that are related to method for clustering data points in a multidimensional dataset in a multidimensional image space. The method comprises generating a multidimensional image from the multidimensional dataset; generating a pyramid of multidimensional images having varying resolution levels by successively performing a pyramidal sub-sampling of the multidimensional image; identifying data clusters at each resolution level of the pyramid by applying a set of perceptual grouping constraints; and determining levels of a clustering hierarchy by identifying each salient bend in a variation curve of a magnitude of identified data clusters as a function of pyramid resolution level.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to cluster data points in a multidimensional dataset in a multidimensional image space in a manner that performs pyramidal clustering by applying perceptual grouping constraints to identify multi-level structures in the dataset, can automatically determine the number of perceivable clusters at each level of an image pyramid, and can thereby determine a hierarchical clustering for the dataset.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

In exemplary embodiments of the present invention, concepts of perceptual grouping are exploited for clustering multidimensional datasets to determine the hierarchical structures. Perceptual grouping refers to the human visual ability to extract significant image relations from lower-level primitive image features without any knowledge of the image content and thereby group them to obtain meaningful higher-level structure. Thus, perceptual grouping concepts as implemented in exemplary embodiments described herein implicitly use some aspects of processing that can be directly related to the pattern recognition processes of the human visual system. The human visual system can detect many classes of patterns and statistically significant arrangements of image elements. Perceptual grouping aims at reducing ambiguity in image data or in initial segmentation and thus at increasing the robustness and efficiency of subsequent processing steps.

Figure 1:
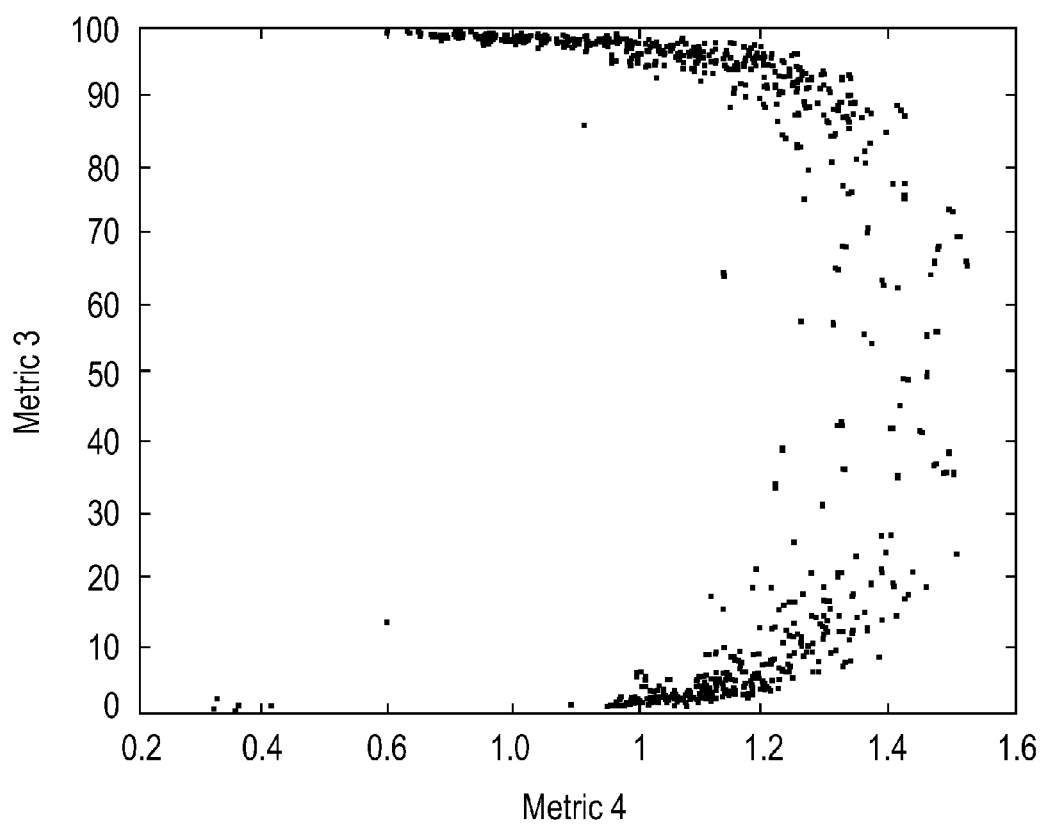
FIG. 1 is a graph illustrating an exemplary functional dependency between a pair of time series.
Figure 2:
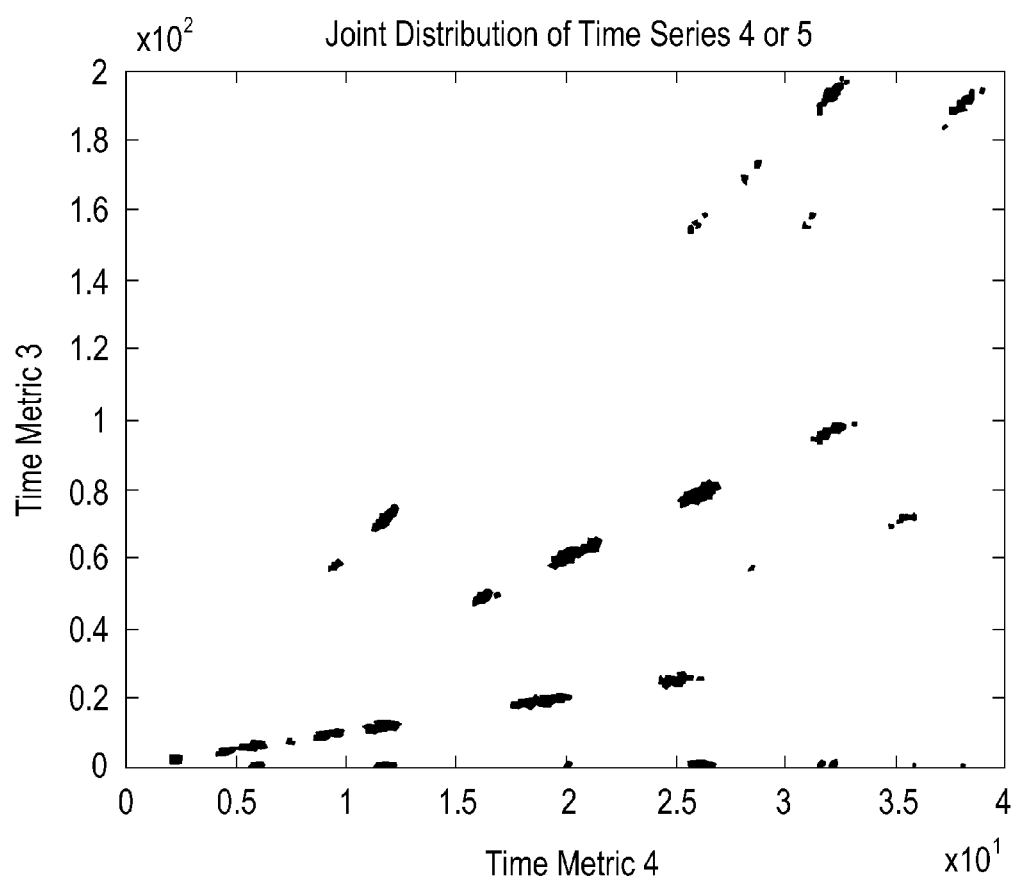
FIG. 2 is a graph illustrating exemplary functional dependencies between a pair of time series.
Figure 3A:
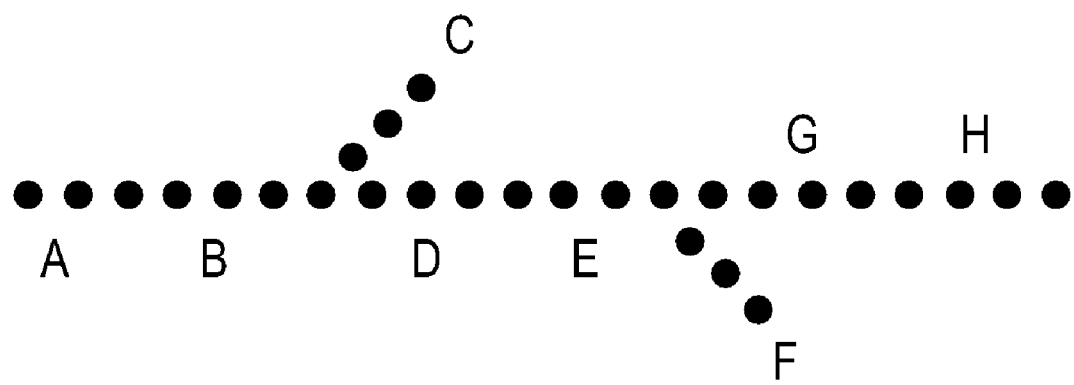
FIGS. 3a and 3b are illustrations of exemplary arrangements of points to which perceptual grouping cues can be applied.
Figure 3B:

A number of factors have been known to influence the parts of an image that are combined to form an object. The use of perceptual grouping in pattern recognition involves clustering data points based upon factors embodying some or all of the relevant human perceivable attributes of parallelism, co-linearity, proximity, similarity, good continuation, orientation, connectivity, density, symmetry, etc. These factors are based on the Gestalt principles of psychology. As an example, FIGS. 3a and 3b show the close applicability of perceptual grouping to clustering. FIG. 3a illustrates an exemplary arrangement of points where proximity as well as continuity of orientation can help isolate the three lines (that is, the C and F splits and the main line A-H in the middle). FIG. 3b illustrates an exemplary case in which the density difference is the primary perceptual grouping cue used to separate the two objects (that is, the inner and outer discs).

Exemplary embodiments described herein embody methods for extracting perceptually salient clusters/groups from multidimensional datasets using perceptual grouping as a way of clustering. The multidimensional feature space is modeled as a multidimensional image, clustering is posed as a problem of object extraction from sparse and noisy data, and perceptual grouping constraints are utilized to successively group sample points into dense clusters in multidimensional spaces. To accommodate perceptual groups that may occur at different scales, the grouping is carried over progressively sub-sampled images using a pyramid scheme to identify clustering levels. Exemplary embodiments as described herein are applicable to suitable multidimensional datasets in any arbitrary application domain or field.

Figure 4:
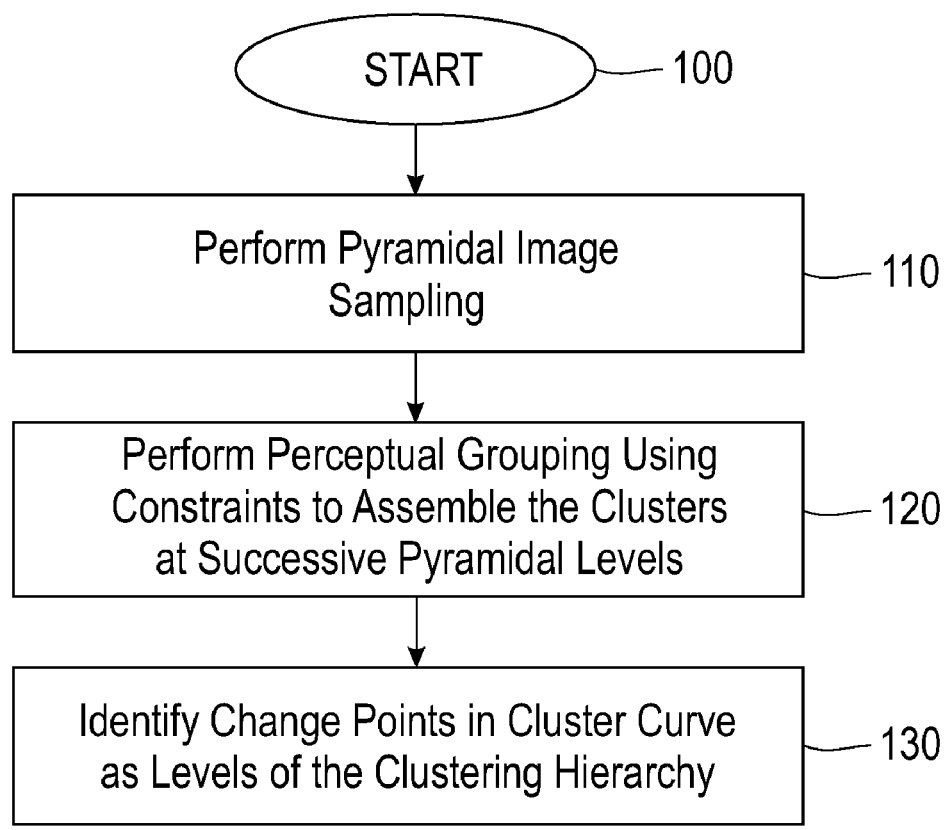
FIG. 4 is a flow diagram illustrating an exemplary embodiment of a clustering process in accordance with the present invention.

FIG. 4 illustrates a flow diagram of a process for performing clustering in accordance with an exemplary embodiment of the present invention. Exemplary clustering process 100 consists of three main steps: At step 110, a pyramidal image sampling is performed to create a multidimensional image pyramid by successively sub-sampling the original multidimensional image formed from the dataset. At step 120, a perceptual grouping method is perform at each image size to assemble the clusters from the samples by extracting features from the subspaces formed in the previous image in the image pyramid. That is, perceptual grouping constraints are used to assemble the clusters at successive pyramidal levels. Finally, at step 130, the cluster curve is then obtained and bends in the curve are identified as curvature change points. By noting the image size at each bend, the corresponding subspaces are retained as levels of the clustering hierarchy. Throughout this process, while the sampling of the neighborhood is discrete, the clustering at each level is based upon the actual and not quantized location of each data sample. Each step of the present exemplary embodiment is described in greater detail below. First, however, some terminology for the model used will be outlined.

In an M-dimensional data set of N samples $X=(X_1, X_2, \ldots X_N)$ where each of the $X_i=(f_{1i}, f_{2i}, \ldots f_{Mi})$ is an M-dimensional feature vector in which the features are normalized so that $0 \leq f_{ji} \leq 1.0$, each of the $X_i$ is a point in an $R^M$ space, which can be regarded as an M-dimensional image $I_k$ of size $L_k \times L_k$. Each sample then has an image bin coordinate at level k that is an M-tuple $D_i^k = [q_{1i}^k \ldots q_{Mi}^k]^T$ where $0 \leq q_{ji}^k \leq L_k - 1$ are the bin coordinates representing the pixel in the image. Each image bin at level k is an M-dimensional unit of size $$\left( \frac{1}{L_k} \times \frac{1}{L_k} \times \ldots \times \frac{1}{L_k} \right).$$

In this model, clusters become multidimensional regions or subspaces with image intensity formed from the cluster number, so that at each image size $L_k$, the sample $X_i$ belonging to cluster $c_l^k$ is represented by an intensity $c_l^k$ at the pixel $D^k = [q_{1i}^k \ldots q_{Mi}^k]^T$. The set of clusters at each image size $L_k$ is denoted by $C^k = \{c_1^k, c_2^k, \ldots c_{n_k}^k\}$ where $n_k$ are the distinct number of subspaces at image size $L_k$.

The variation in the number of clusters as a function of image size is given by a 1D-cluster curve $z = \{(n_k, L_k) | k = 0, \ldots T\}$. The bends in the curve, that is, points at which there is a significant change of curvature $z_p = (x(p), y(p))$ are noted to form the clustering levels $C^p$ of the clustering hierarchy. It should be noted that while pyramidal level and hierarchical clustering levels are distinguished, for some data distributions, they may coincide.

Referring again to the exemplary embodiment shown in FIG. 4, at step 110, a pyramidal image sampling scheme is performed to create a multidimensional image pyramid by successively sub-sampling the original multidimensional image formed from the dataset. Any appropriate technique for pyramidal image sampling of the multidimensional dataset can be used. Several known methods have been implemented for image sampling—for example, in cross-section, radial section, or spiral (Archimedean and logarithmic) form—to obtain vector data from image greyscale values that have shown to be successful in obtaining representative samples. Following the convention in pyramid image representations, a logarithmic sampling scheme is used in the present exemplary embodiment. Because all the feature dimensions are normalized to be in the range [0,1], a square grid can be used. The scheme starts with an image of size $L_0 \times L_0$, and each successive image is of size $L_i \times L_i$ where $$L_i = \frac{L_{i-1}}{2}$$

until an image size of 1×1 is reached. The pyramid sampling scheme is sufficient to bring out all groups that obey the selected grouping constraints.

The pyramid image sampling scheme can be used as a systemic way to explore such multi-level grouping by applying multi-resolution grouping constraints to achieve a meaningful semantic representation. That is, the multidimensional space is modeled as a multidimensional image with pyramidal sub-sampling for representing the features at lower resolution such that higher level structures are extracted from the dataset. This sampling scheme exploits the characteristic of images that indicate that neighboring pixels are highly correlated. An example of a pyramid is the Laplacian pyramid, which is obtained by convolving the image with a Gaussian kernel. The Laplacian is then computed as the difference between the original image and the low pass filtered image to create a sequence of band-pass filtered representations. This process is continued to obtain a set of band-pass filtered images, each being the difference between two levels of the Gaussian pyramid. Thus, the Laplacian pyramid is a set of band pass filters at successively lower resolutions or image sizes.

In exemplary process 100, after pyramidal sampling is performed, perceptual grouping constraints are used at step 120 to cluster the multidimensional dataset into smaller numbers of spatial and computational complexity tractable clusters at successive pyramidal levels by extracting features from the subspaces formed in the previous image in the pyramid. The cluster labels of the previous pyramid level serve as the intensity values for the current pyramid level and remain in the same cluster at the next pyramid level. This property not only ensures nested clusters across the cluster hierarchy, but also makes it possible to generate the groupings using a logarithmic scale of multi-resolution. Thus, the image size is successively sub-sampled or equivalently reduced and those perceptual groups that persist the longest as the image shrinks are selected.

In the present exemplary embodiment, the perceptual grouping constraints of proximity, density, orientation similarity, and region contiguity are utilized to successively group sample points into dense clusters in multidimensional spaces. Due to sparse and irregular nature of point distribution in clustering, the emergence of higher-level structures is rarely apparent through a single pass of the image. Initial grouping may yield some structures, and these structures may be further combined to yield another level of higher-level structures. This process can be repeated until a meaningful semantic representation is achieved. The grouping constraints that are utilized, which will now be described in greater detail, determine whether pixels can be grouped.

In the present exemplary embodiment, using the multidimensional image model outlined above, a pair of points $(X_i, X_j)$ are considered proximal at pyramidal level k if $\|D_i^k - D_j^k\| \leq 1$ or $|q_{li}^k - q_{lj}^k| \leq 1, \forall 1 \leq l \leq M$. The $\|\ \|$ operation stands for the absolute value. For the 2-dimensional case, it corresponds to the use of a 3×3 neighborhood around a pixel.

At each pyramid level, the grouping will consider the clusters from the previous level as the grouping elements. Thus, the proximity constraints state that they can be merged provided at least a pair of their respective image bins is adjacent. By letting $D^k(c_i)=\{D_{1i}^k, \ldots D_{li}^k\}$ be the set of image bins at level k occupied by the cluster $c_i^{k-1}$ (that is, at least one of the sample points of the cluster belongs to one of the image bins), the proximity constraint to group two clusters $c_i^{k-1}$, $c_j^{k-1}$ from level k-1 into one at level k can be given as $\exists l, m|D|D_{li}^k - D_{mj}^k| \leq 1$.

Using the multidimensional image model outlined above, the average density of a cluster obtained at pyramid level k is obtained by noting the average number of samples with the given cluster label in an image bin. By letting $N_c^k$ be the number of image bins for cluster c at pyramid level k and $n_{cl}^k$ be the number of sample points belonging to cluster c in bin l at pyramid level k, the average density of the cluster c is can be given by $$Density(c^k) = \frac{\sum_{l=1}^{N_c^k} n_{cl}^k}{N_c^k}.$$

The grouping constraint of density attempts to group clusters that have a small difference in density. That is, given two clusters from pyramid level k-1, $c_1^{k-1}$, $c_j^{k-1}$, the density constraint is $|Density(c_i^{k-1})-Density(c_j^{k-1})| \leq \tau$.

Using the multidimensional image model outlined above, the orientation of the subspace can be characterized by the eigenvectors of the covariance matrix of the subspace. The covariance matrix of the cluster c is given by $X_c X_c^T$, where $X_c$ are the set of sample points that fall into the cluster c. The eigenvectors are obtained from the characteristic equation $((X_c X_c^T - \lambda I)v = 0$, where $\lambda$ are the eigenvalues obtained by solving the characteristic polynomial $det(_c X_c^T - \lambda I) = 0$. Because the covariance matrix is symmetric, the eigenvalues are real and the eigenvectors are orthogonal. In practice, the orientation of the cluster can be determined by the eigenvectors corresponding to the largest eigenvalue.

The orientation constraint of grouping operates to group those clusters from a previous pyramid level at the next level when there is a small difference in their orientation. By letting $v_i$, $v_j$ be the eigenvectors corresponding to the largest eigenvalues for two clusters $c_i^{k-1}, c_j^{k-1}$ respectively, the two clusters are merged at the next pyramid level k if $\Theta(c_i^{k-1}, c_j^{k-1}) = |v_i, v_j| \geq \rho$, where $0 \leq \rho \leq 1.0$. Here, the dot product represents the cosine of the angle between the above unit eigenvectors.

Using the multidimensional image model outlined above, region contiguity should be implemented as a three-way constraint to determine if two of the regions belonging to different groups being merged potentially intersect with a third region belonging to a group that is already assembled, which would result in physically implausible clusters. The potential for having clusters consisting of intersecting regions belonging to different clusters is a particular concern at higher levels of the image pyramid. For purposes of perceptual grouping, the contiguity of two potential groups $c_i^{k-1}$ and $c_j^{k-1}$ can be detected if the potential minimum spanning tree (MST) formed from their merger $V_{ij}^k$ does not have an edge intersecting with the MST $V_l^k$ of a group already formed at this level $c_l^k$ or with $V_m^{k-1}$ for the region $c_m^{k-1}$ at previous scale. The merger $V_{ij}^k = V_i^{k-1} \cup V_j^{k-1} \cup \{E_{min}\}$ where $E_{min} = min\{E_{uv}, u \in c_i^{k-1}, v \in c_j^{k-1}\}$ and $E_{uv}$ is the distance between the M-dimensional points u and v belonging to groups $c_i^{k-1}$ and $c_j^{k-1}$ respectively. The two groups $c_i^{k-1}$ and $c^{k-1}$ meet the contiguity constraint if $E_{min} \triangleright V_l^{k'}$ where k'32 k or k-1 (as the case may be) and $\triangleright$ denotes no proper line segment intersection.

Figure 6:
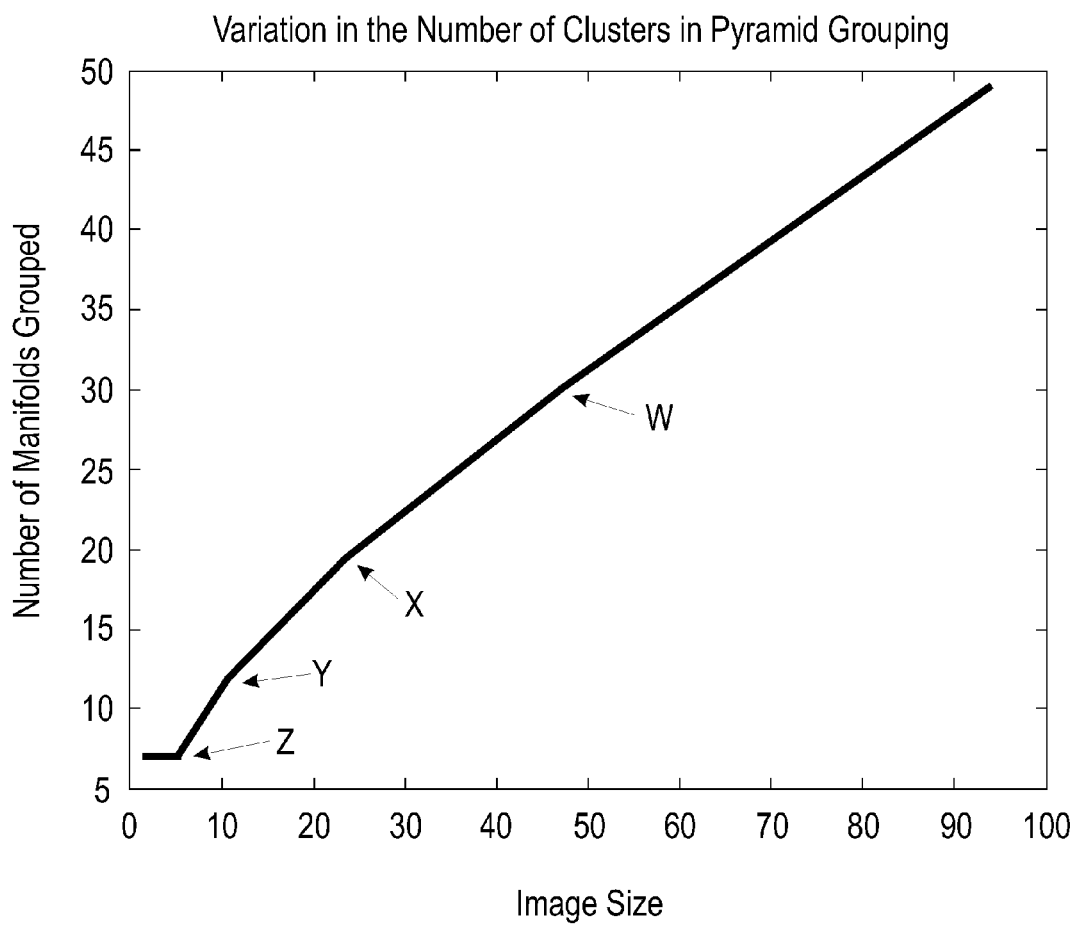
FIG. 6 illustrates a graph of an exemplary variation curve of a magnitude of clusters identified from a dataset as a function of image resolution level.

At each step of the pyramid, process 100 returns the number of clusters as the connected components grouped. Generally, the number of distinct groups can be expected to decrease with coarseness of sub-sampling until the minimum is reached. In the present exemplary embodiment, at step 130, the cluster curve is obtained and salient bends in the curve are identified as curvature change points to determine the clustering hierarchy. In practice, the number of clusters as a function of image sample size can be represented as a monotonically decreasing curve. FIG. 6 illustrates a graph of an exemplary variation of clusters for a sample set as a function of image resolution. The salient bends W, X, Y, and Z indicated by the arrows on the curve are used as levels of hierarchical clustering. Although the pyramidal representation gives the multi-resolution decomposition for purposes of grouping, not all levels may produce distinct changes in the grouping. Rather, distinct groups may emerge at certain levels of resolution and such emergence is usually marked with a distinct change in the number of clusters.

By plotting the variation in the number of clusters as a function of the image resolution, a pronounced bend can be observed at distinct points when salient groups emerge. These sharp changes in the cluster curve at points of steep slope or slope change can be used to signal the various levels in a hierarchical clustering. In particular, the last salient bend before the image shrinks to zero can be taken as the residual clusters at the top level. In exemplary embodiments, these change points can be detected using an algorithm for scale-space salient change detection in which the bends are identified as curvature change points, that is, where there is a zero crossing in the second derivative of the signal. By noting the image size at each bend, the corresponding subspaces are retained as levels of the clustering hierarchy. It should be noted that with the pyramidal grouping, the highest level need not be limited to a single cluster as in conventional agglomerative clustering because region grouping is dictated not only by proximity but also by orientation and change in density.

Figure 5A:
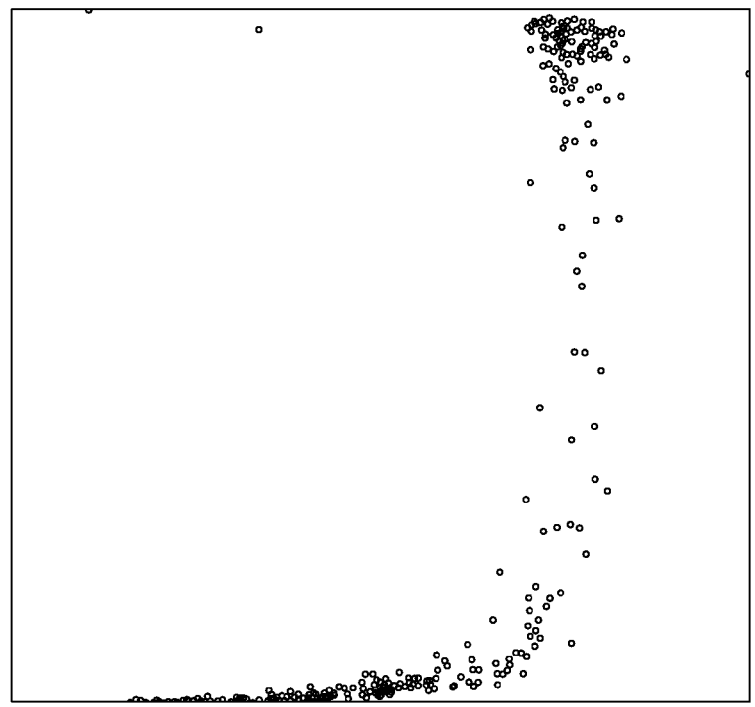
FIGS. 5a-5f illustrate graphs of different levels of an exemplary pyramidal grouping generated while performing the exemplary clustering process illustrated in FIG. 4.
Figure 5B:
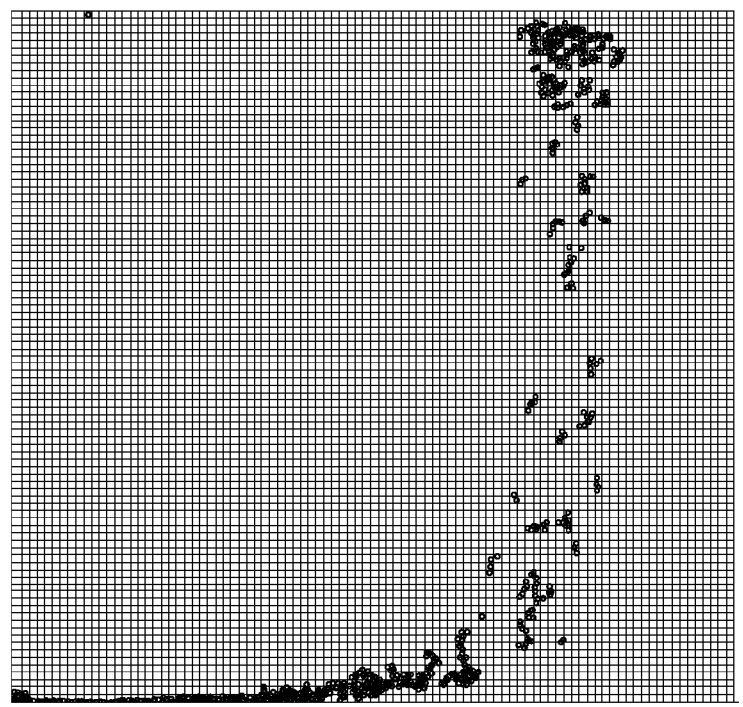
Figure 5C:
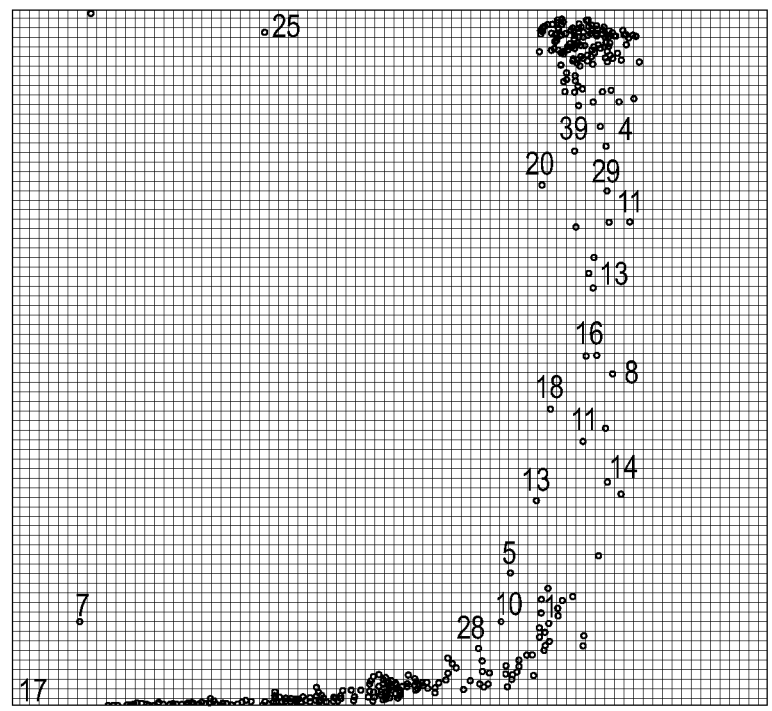
Figure 5D:
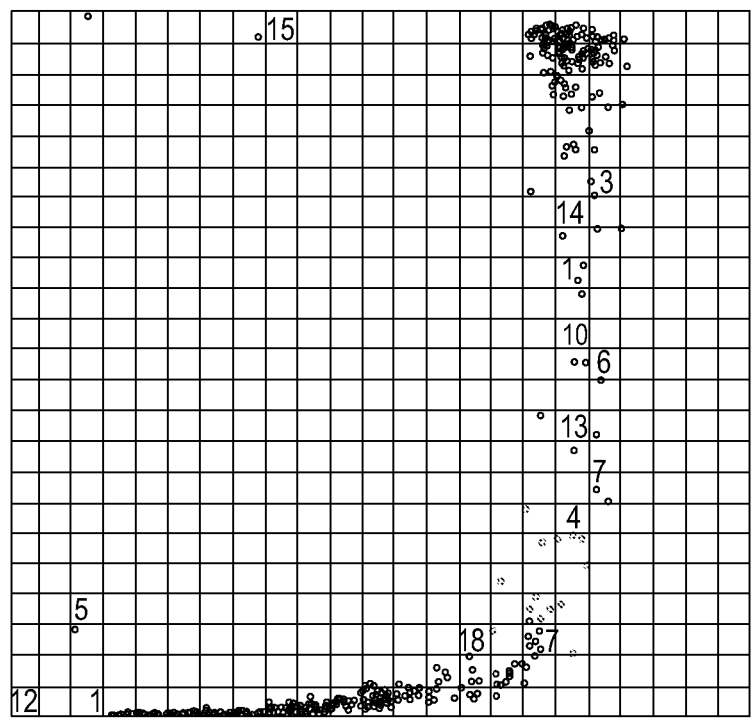
Figure 5E:
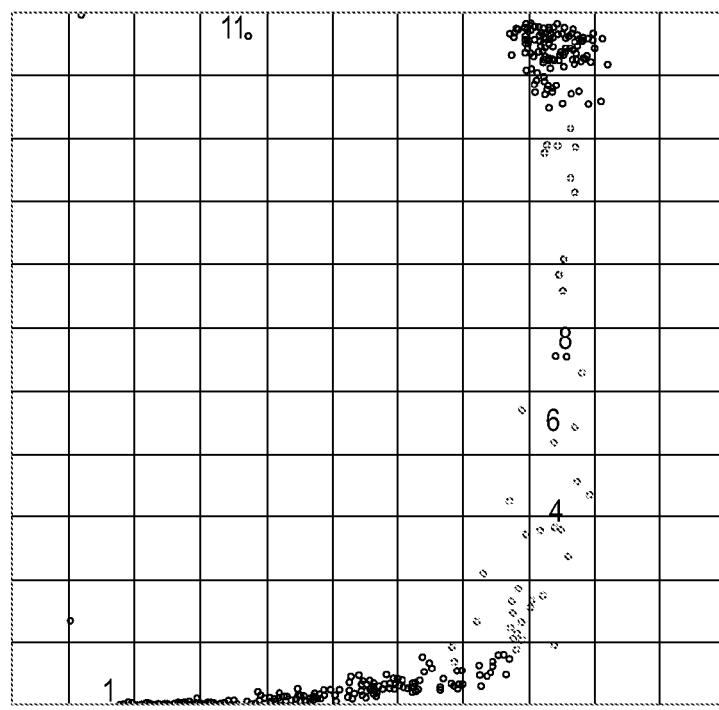
Figure 5F:
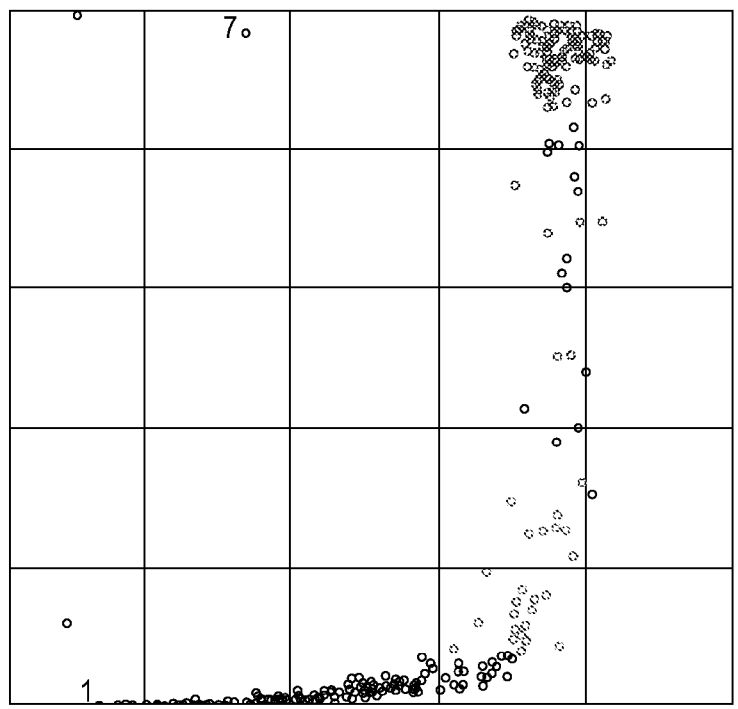

FIGS. 5a-5f are graphs illustrating the different levels of an exemplary pyramidal grouping performed in accordance with the present exemplary process. In this exemplary embodiment, multi-resolution decomposition is used to guide the perceptual grouping of data points using factors of proximity, orientation, and density. The number of clusters decreases as a function of image size. FIG. 5a shows the original data. The clustering can be produced at each level in the hierarchy by using the bends on this curve as an indication of level are shown in FIGS. 5b-5f. As can be seen, there are only a few levels of clustering, with the top level of the hierarchy representing the top-level structures perceived in the dataset without grouping all the data points into a single cluster, which is remarkably different from conventional hierarchical clustering schemes.

As described above, the exemplary clustering process illustrated in FIG. 4 can be used to create a multidimensional image pyramid by successively sub-sampling the original multidimensional image formed from the data samples. The exemplary clustering process is based upon perceptual grouping concepts that are applicable to high-dimensional spaces. The approach identifies bends in cluster curves that it then uses to determine the cluster hierarchy. The process can identify clusters which would be obvious using a visual metaphor but would otherwise be unrecognized using only proximity based measures. The details of the exemplary clustering process illustrated in FIG. 4 can be summarized as follows:

1. At level 0, $c_i^0 = X_i$, Density($c_i$)=1.0, and $\Theta(c_i^0, c_j^0)$=1.0, and $D^0(c_i) = \{D_i^0\}$.

2. Given the subspaces (clusters from pyramid level k−1), the clusters at level k are assembled. Let $n_k$ be the number of clusters at pyramid level k.

3. For k=1 to log $L_0$ do

```
For i=1 to n_{k-1} do
    Make-set(i);
For i=1 to n_{k-1} do
    For j=i+1 to n_{k-1} do
        If (∃l,m|D_{li}^k − D_{mj}^k|≤1) &&
           (_Density(c_i^{k-1})−Density(c_j^{k-1})≦τ) &&
           ( Θ(c_i^{k-1},c_j^{k-1}) ≧ ρ) &&
           (E_min ▷ V_1^k)
        {
            if (find-set(i) ≠ find-set(j))
                union-find(i,j)
        }
```

4. Find salient bends in the curve plotting the $n_k$ vs. $L_k$. Let the bends be at positions $\{(L_{l_1}, n_{l_1}), \ldots (L_{l_S}, n_{l_S})\}$.

5. The hierarchical levels for clustering are given by $\{L_{l_1}, \ldots L_{l_S}\}$. The corresponding clusters at each cluster hierarchy level are identified as $$\{\{C_1^h, \ldots C_{n_h}^h\} \ldots \{C_1^{l_S}, \ldots C_{n_S}^{l_S}\}\}.$$

The exemplary process has three parameters, namely, $L_0$, τ, ρ, that can be chosen as follows. The starting image size for the pyramidal sampling can be taken as the minimum non-zero distance between pairs of sample points in the data set. Nevertheless, a starting sampling size based on the distance that is at $1/100$th percentile in the sorted list of distances between pairs of points can usually be sufficient. In this case, supposing the pair-wise Euclidean distance at $1/100^{th}$ percentile is $$d, L_0 = \left\lceil \frac{1}{d} \right\rceil.$$

The process does not require a priori information regarding to the number of clusters or starting points for the computation.

In exemplary embodiments, the clustering output can be generated in the form of a tabular list of point coordinates along the corresponding cluster labels. The output can also be visualized using any suitable technique for visualizing clustering results.

The capabilities of exemplary embodiments of present invention described above can be implemented in software, firmware, hardware, or some combination thereof, and may be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. Exemplary embodiments of the present invention can also be embedded in a computer program product, which comprises features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Therefore, one or more aspects of exemplary embodiments of the present invention can be included in an article of manufacture (for example, one or more computer program products) having, for instance, computer usable media. The media has embodied therein, for instance, computer readable program code means for providing and facilitating the capabilities of the present invention. The article of manufacture can be included as a part of a computer system or sold separately. Furthermore, at least one program storage device readable by a machine, tangibly embodying at least one program of instructions executable by the machine to perform the capabilities of the exemplary embodiments of the present invention described above can be provided.

Figure 7:
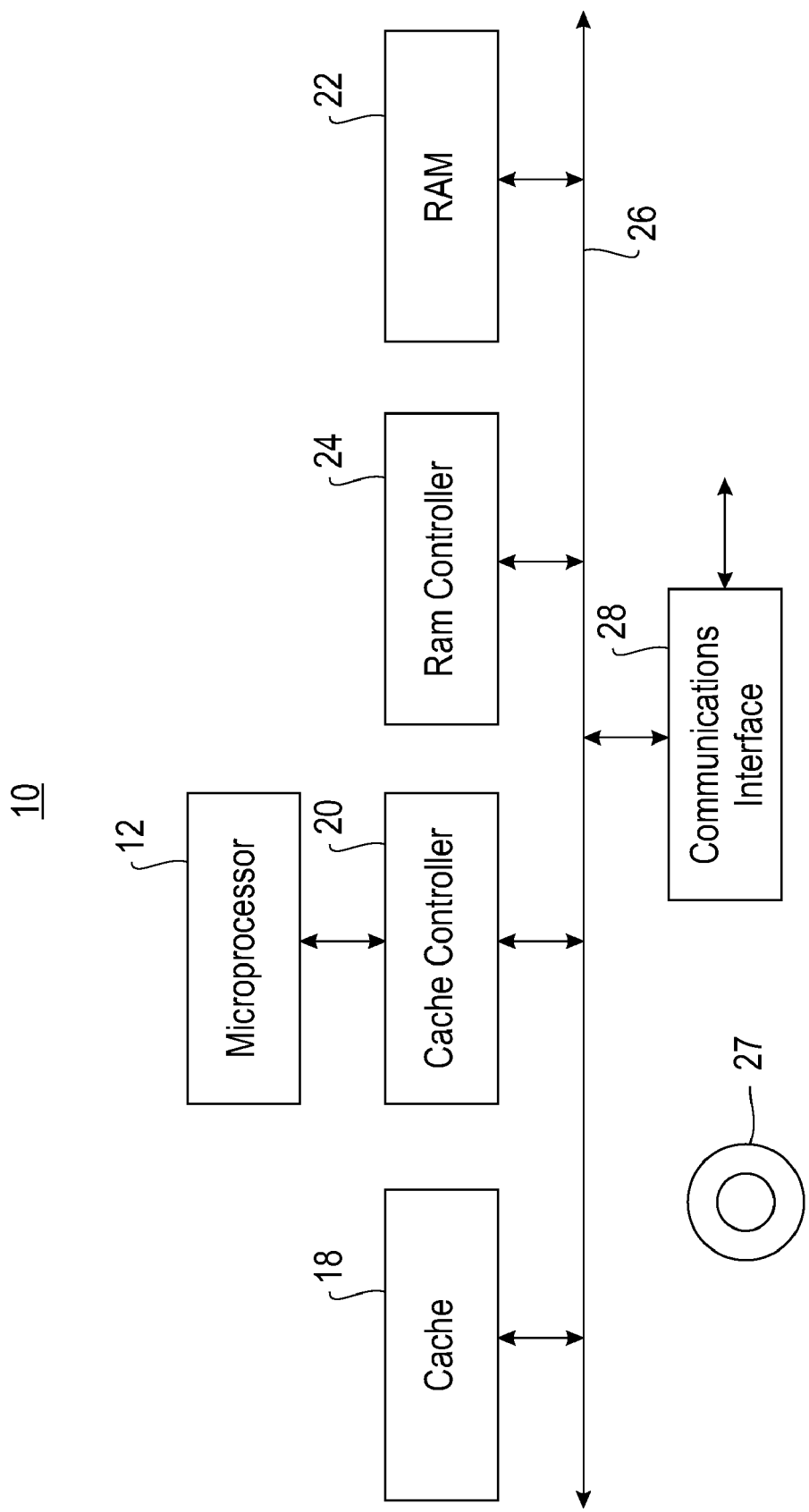
FIG. 7 is a block diagram illustrating an exemplary hardware configuration or a computer system within which exemplary embodiments of the present invention can be implemented.

For instance, exemplary embodiments of the present invention can be implemented within the exemplary embodiment of a hardware configuration provided for a computer system in FIG. 7. FIG. 7 illustrates an exemplary computer system 10 upon which exemplary embodiments of the present invention can be implemented. A processor or CPU 12 receives data and instructions for operating upon from on-board cache memory or further cache memory 18, possibly through the mediation of a cache controller 20, which can in turn receives such data from system read/write memory ("RAM") 22 through a RAM controller 24, or from various peripheral devices through a system bus 26. The data and instruction contents of RAM 22 will ordinarily have been loaded from peripheral devices such as a system disk 27. Alternative sources include communications interface 28, which can receive instructions and data from other computer systems.

The above-described program or modules implementing exemplary embodiments of the present invention can work on processor 12 and the like to perform clustering. The program or modules implementing exemplary embodiments may be stored in an external storage medium. In addition to system disk 27, an optical recording medium such as a DVD and a PD, a magneto-optical recording medium such as a MD, a tape medium, a semiconductor memory such as an IC card, and the like may be used as the storage medium. Moreover, the program may be provided to computer system 10 through the network by using, as the recording medium, a storage device such as a hard disk or a RAM, which is provided in a server system connected to a dedicated communication network or the Internet.

Although exemplary embodiments of the present invention have been described in detail, it should be understood that various changes, substitutions and alternations can be made therein without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for clustering data points in a multidimensional dataset in a multidimensional image space, the method comprising:
   generating a multidimensional image from the multidimensional dataset;
   generating a pyramid of multidimensional images having varying resolution levels by successively performing a pyramidal sub-sampling of the multidimensional image;
   identifying data clusters at each resolution level of the pyramid by applying a set of perceptual grouping constraints; and
   determining levels of a clustering hierarchy by identifying each salient bend in a variation curve of a magnitude of identified data clusters as a function of pyramid resolution level.

2. The method of claim 1, wherein the pyramidal sub-sampling performed comprises a logarithmic sampling strategy.

3. The method of claim 1, wherein identifying data clusters at each resolution level comprises identifying data clusters at a top resolution level of the pyramid by applying the set of perceptual grouping constraints, and identifying data clusters at each successively lower resolution level of the pyramid by extracting clusters identified at the previous resolution level and applying the set of perceptual grouping constraints.

4. The method of claim 1, wherein the set of perceptual grouping constraints comprises proximity, density, orientation similarity, and region contiguity.

5. The method of claim 1, wherein determining levels of the clustering hierarchy comprises identifying salient bends at points at which there is a zero crossing in a second derivative of the variation curve.

* * * * *